United States Patent [19]

Serini et al.

[11] Patent Number: 5,034,458
[45] Date of Patent: Jul. 23, 1991

[54] POLYCARBONATES OF SUBSTITUTED CYCLOHEXYLINDENEBISPHENOLS

[75] Inventors: Volker Serini; Dieter Freitag; Karsten-Josef Idel, all of Krefeld; Ulrich Grigo, Kempen, all of Fed. Rep. of Germany

[73] Assignee: Bayer Aktiengesellschaft, Leverkusen, Fed. Rep. of Germany

[21] Appl. No.: 565,290

[22] Filed: Aug. 9, 1990

[30] Foreign Application Priority Data

Aug. 22, 1989 [DE] Fed. Rep. of Germany ........ 3927656

[51] Int. Cl.$^5$ ........................ C08G 64/06; C08L 69/00
[52] U.S. Cl. ........................ 525/67; 525/92; 525/146; 525/147; 525/433; 525/439; 525/453; 525/462; 525/464; 525/469
[58] Field of Search .................. 528/196, 204; 525/67, 525/92, 146, 147, 433, 439, 453, 462, 464, 469

[56] References Cited

U.S. PATENT DOCUMENTS 2,538,725  1/1951  Johnson et al. ............... 167/53.1
4,368,315  1/1983  Sikdar ........................ 528/198
4,982,014  1/1991  Freitag et al. ................ 568/721

FOREIGN PATENT DOCUMENTS 0019126  11/1980  European Pat. Off. .
0019127  11/1980  European Pat. Off. .
61-062039  3/1986  Japan .
61-062040  3/1986  Japan .
61-105550  5/1986  Japan .
1543146  11/1976  United Kingdom .

OTHER PUBLICATIONS

Schnell, H., "Chemistry & Physics of Polycarbonates", 1964, Interscience Publishers, pp. 89, 90, 104 and 106.

Primary Examiner—John C. Bleutge
Assistant Examiner—David Buttner
Attorney, Agent, or Firm—Joseph C. Gil; Aron Preis

[57] ABSTRACT

Aromatic polycarbonates having weight average molecular weight $\overline{M}_w$ of at least 10,000 which contain bifunctional carbonate structural units corresponding to general formula (I):

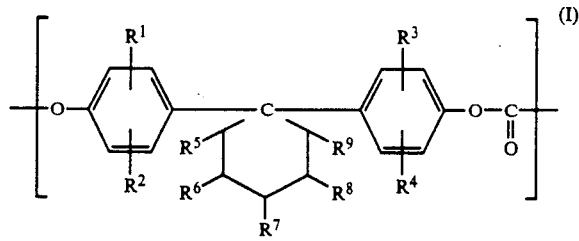

wherein
$R^1$, $R^2$, $R^3$, $R^4$ independently represent hydrogen, $C_1$-$C_{12}$ hdyrocarbon or halogen radicals; and
$R^5$, $R^6$, $R^7$, $R^8$ and $R^9$ independently represent hydrogen or $C_1$-$C_{12}$ hydrocarbon radicals, one or $R^5$ and $R^9$ representing hydrogen and the other $C_1$-$C_{12}$ hydrocarbon radical;

in amounts of from 100 to 1 mole % based on the total amount of difunctional carbonate structural units in the polycarbonate were found to be useful for thermoplast processing of compositions which are characterized by their improved toughness and high heat deflection temperature.

2 Claims, No Drawings

POLYCARBONATES OF SUBSTITUTED CYCLOHEXYLINDENEBISPHENOLS

This invention relates to aromatic polycarbonates having weight average molecular weights $M_w$ of at least 10,000, preferably from 10,000 to 250,000, more preferably from 15,000 to g0,000 especially from 20,000 to 60,000 and in particular from 20,000 to 40,000, which contain bifunctional carbonate structural units corresponding to general formula (I):

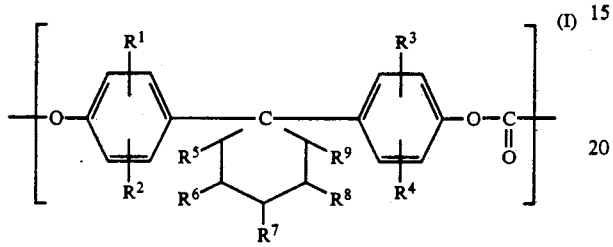

wherein $R^1$, $R^2$, $R^3$, $R^4$ independently represent hydrogen, $C_1$-$C_{12}$ hydrocarbon or halogen radicals and $R^5$, $R^6$, $R^7$, $R^8$ and $R^9$ independently represent hydrogen or $C_1$-$C_{12}$ hydrocarbon radicals, one of $R^5$ and $R^9$ representing hydrogen and the other $C_1$-$C_{12}$ hydro-carbon radicals;

in amounts of from 100 to 1 mole %, preferably from 100 to 10 mole %, more preferably from 100 to 20 mole %, especially from 100 to 40 mole % and in particular from 100 to 70 mole %, and most preferred of 100 mole %, related to the total amount of difunctional carbonate structural units in the polycarbonate, and to the use thereof for manufacturing shaped articles by the methods of thermoplastic processing.

The present invention also relates to blends of:

(A) from 1 to 99 weight % of at least one of the present polycarbonates as described above;

(B) from 0 to 99 weight % of at least one amorphous thermoplastic different from (A) having a glass transition temperature of from 40° to 300° C.;

(C) from 0 to 99 weight % of at least one partially crystalline thermoplastic having a melting point of from 60° to 400° C.;

(D) from 0 to 99 weight % of at least one rubber;

(E) from 0 to 99 weight % of at least one graft polymer based on at least one rubber having at least one grafted polymer comprising at least one monomer selected from vinyl compounds, acrylic and methacrylic compounds and maleic acid derivatives;

wherein the sum of (A), (B), (C), (D) and (E) is 100 weight %; and to the use thereof for thermoplastic processing to mouldings.

In Japanese patent specifications 61 062 039, 61 062 04and 61 105 550, polycarbonates are described which consist partially or entirely of structural units corresponding to general formula (IA);

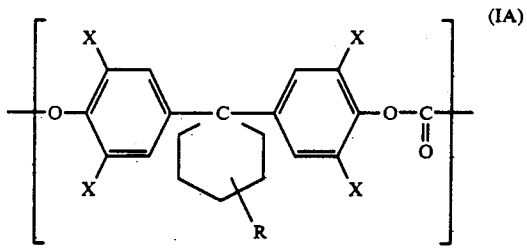

wherein

X and X' represent hydrogen, halogen or methyl; and
R represents hydrogen, halogen, OH, COOH, acetyl or $C_1$-$C_4$ alkyl (in JP 61 062 040 $C_1$-$C_5$ alkyl).

Mentioned as examples of carbonate structural units (IA) are carbonate structural units based on 1,I-bis-(4-hydroxyphenyl)-3-methylcyclohexane and 1,1-bis-(4-hydroxyphenyl)-4-methylcyclohexane. Carbonate structural units (IA) based on 1,1-bis-(4-hydroxyphenyl)-4-methylcyclohexane are also included in JA 61 105 550 at 50 mole % in a copolycarbonate with bisphenol A. The carbonate structural units (I) underlying the present polycarbonates are not, however, described in the above-mentioned Japanese patent specifications. It has now surprisingly been found that polycarbonates based on bifunctional carbonate structural units (I) show advantages over the polycarbonates previously described in the above-mentioned Japanese patent specifications having carbonate structural units based on 1,1-bis-(4-hydroxyphenyl)-3-methylcyclohexane and 1,1-bis-(4-hydroxyphenyl)-4-methylcyclohexane. Furthermore it has surprisingly been found that, contrary to the expectations of those skilled in the art, the thermoplastic processing of the polycarbonates according to the present invention may be carried out in a technically acceptable manner and the mouldings obtainable show astonishingly good properties.

Compared with the polycarbonates having carbonate structural units based on 1,1-bis-(4-hydroxyphenyl)-3-methylcyclohexane and 1,1-bis-(4-hydroxyphenyl)-4-methylcyclohexane described in the Japanese patent specifications, the polycarbonates according to the present invention having carbonate structural units based on 1,1-bis-(4-hydroxyphenyl)-2-methylcyclohexane, for example, show greater toughness against impact and shock with good heat deflection temperature.

The carbonate structural units (I) are based on bisphenols corresponding to general formula (II),

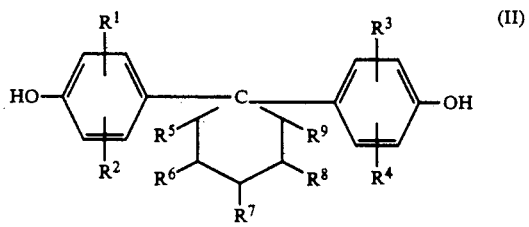

wherein $R^1$, $R^2$, $R^3$, $R^4$, $R^5$, $R^6$, $R^7$, $R^8$, and $R^9$ are as defined in connection with general formula (I).

In general formula (I) and (II), $R^1$, $R^2$, $R^3$ and $R^4$ preferably represent hydrogen, methyl, ethyl, phenyl, cyclohexyl, chlorine and bromine; especially, however, hydrogen, methyl and bromine, in particular hydrogen.

If more than one of the groups $R^1$, $R^2$, $R^3$ and $R^4$ represent other than hydrogen, identical substituents are preferred. If two of the groups $R^1$, $R^2$, $R^3$ and $R^4$ represent other than hydrogen, o,o'-substitution, referring to the carbonate groups (general formula (I)) or the phenolic OH groups (general formula (II)), is preferred. If all four of the groups $R^1$, $R^2$, $R^3$ and $R^4$ represent other than hydrogen corresponding o,o,o',o'-substitution is preferred.

In (I) and (II), preferably at least two of $R^5$, $R^6$, $R^7$, $R^8$ and $R^9$ represent $C_1$-$C_2$ hydrocarbyl. Furthermore, in (I) and (II), preferably $R^6$ and $R^8$ in addition to one of $R^5$ and $R^9$ represent $C_1$-$C_{12}$ hydrocarbyl.

In (I) and (II), $R^5$, $R^6$, $R^7$, and $R^9$ may represent $C_1$-$C_{12}$ hydrocarbyl groups. Such hydrocarbyl groups are, for example, D-alkyl groups, such as methyl, ethyl, n-propyl, n-butyl, D-pentyl, D-hexyl, n-heptyl, n-octyl, n-nonyl, n-decyl, n-undecyl and n-dodecyl, as well as $C_3$-$C_{12}$ isoalkyl groups, such as isopropyl, t-butyl, 1-methylpropyl, 1,1-dimethylpropyl, 1-methylbutyl, 1,2,2-dimethylpropyl, isohexyl, isoheptyl, isooctyl (such as 1,1,3,3-tetramethylbutyl), isononyl (such as 3,5-dimethylheptyl), isodecyl, isoundecyl and isododecyl, and also $C_6$-$C_{12}$ cycloalkyl, such as cyclohexyl, n-alkyl- or isoalkyl-substituted cyclohexyl (such as methyl-, ethyl-, isopropyl- or t-butylcyclohexyl), aryl-substituted cyclohexyl (such as phenylcyclohexyl) and cyclohexyl to which phenyl groups are fused, aryl (such as phenyl and naphthyl), aralkyl (such as benzyl and cumenyl), alkaryl (such as methylphenyl and isopropylphenyl) and cycloalkylsubstituted alkyl (such as perhydrocumenyl)

In (I) and (II), the preferred $C_1$-$C_{12}$ hydrocarbyl groups for $R^6$, $R^7$ and $R^8$ are methyl, ethyl, t-butyl, 1,1-dimethylpropyl, 1,1,3,3-tetramethylbutyl, phenyl, cyclohexyl, phenyl-substituted $C_1$-$C_3$ alkyl, cyclohexyl-substituted $C_1$-$C_3$ alkyl, and especially methyl, t-butyl, 1,1,3,3-tetramethylpropyl, phenyl, cyclohexyl, cumenyl and perhydrocumenyl.

In (I) and (II), the preferred $C_1$-$C_{12}$ hydrocarbyl groups for $R^5$ and $R_9$ are methyl and phenyl, especially methyl.

Examples of bisphenols (II) are:
1,1-bis-(4-hydroxyphenyl)-2-methylcyclohexane, 1,1-bis-(3-methyl-4-hydroxyphenyl)-2-methylcyclohexane, 1,1-bis-(3,5-dimethyl-4-hydroxyphenyl)-2-methylcyclohexane,
0   1,1-bis-(3-chloro-4-hydroxyphenyl)-2-methylcyclohexane, 1,1-bis-(3,5-dichloro-4-hydroxyphenyl)-2-methylocyclohexane,
1,1-bis-3,5-dibromo-4-hydroxypheny-1)-2-methylcyclohexane,
1,1-bis-(3-phenyl-4-hydroxyphenyl)-2-methylcyclohexane,
1,1-bis-3,5-diethy-1-4-hydroxypheny-1)-2-methylcyclohexane,
1,1-bis-(4-hydroxyphenyl)-2,3-dimethylcyclohexane,
1,1-bis-(4-hydroxyphenyl)-2,4-dimethylcyclohexane,
1,1-bis-(4-hydroxyphenyl)-2,5-dimethylcyclohexane,
1-bis-(4-hydroxyphenyl)-2,3,5-trimethylcyclohexane,
1,1-bis-(4-hydroxyphenyl)-2,4,5-trimethylcyclohexane,
1,1-bis-(4-hydroxyphenyl)-2-phenylcyclohexane,
1,1-bis-(4-hydroxyphenyl)-2-methyl-4-t-butylcyclohexane,
1,1-bis-(4-hydroxyphenyl)-2-methyl-4-phenylcyclohexane,
1,1-bis-(4-hydroxyphenyl)-2-methyl-5-t-butylcyclohexane,
1,1-bis-(4-hydroxyphenyl)-2-methyl-3,5-di-t-butylcyclohexane,
1,1-bis-(4-hydroxyphenyl)-2-methyl-4-cyclohexylcyclohexane,
1,1-bis-(4-hydroxyphenyl)-2-methyl-4-cumenylcyclohexane,
1,1-bis-(4-hydroxyphenyl)-2-methyl-4-perhydrocumenylcyclohexane.

Such bisphenols may be obtained e.g. from cyclohexanones corresponding to general formula (III):

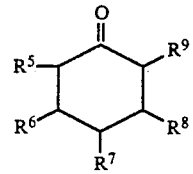
(III)

and phenols corresponding to general formulae (IV) and (IVa);

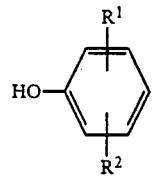 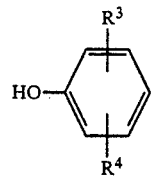

(IV)          (IVa)

Wherein $R^1$, $R^2$, $R^5$, $R^6$, $R^7$, $R^8$ and $R^9$ are as defined above; by reaction at from about 0° to 100° C. in the presence of an acidic catalyst, preferably HCl or an acidic ion-exchanger, and possibly a sulphur-containing co-catalyst, such as 3-mercaptopropionic acid.

The polycarbonates according to the present invention each contain in addition to the carbonate structural units (I), the complementary amounts to 100 mole % of other difunctional carbonate structural units, for example those corresponding to general formula (V), which are based on bisphenols corresponding to general formula (VI):

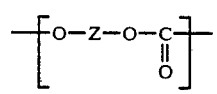
(V)

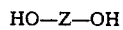 (VI)

Bisphenols (VI) are those wherein Z represents an aromatic group having from 6 to 30 carbon atoms, which may contain one or more aromatic rings, may be substituted and may contain aliphatic groups or other cycloaliphatic groups than those of general formula (II) or heteroatoms as binding links.

Examples of diphenols (VI) are:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
α,α',-bis (hydroxyphenyl)-diisopropylbenzenes, as well as ring-alkylated and ring-halogenated derivatives thereof.

These and other suitable diphenols are described, e.g. in U.S. Pat. No. 3,028,365; 2,999,835; 3,148,172; 3,275,601; 2,991,273; 3,271,367; 3,062,781; 2,970,131 and 2,999,846; German Offenlegungsschrift Nos. 1,570,703; 2,063,050; 2,063,052 and 2,221,956; French Patent No. 1,561,518; and the monograph "H. Schnell, Chemistry and Physics of Polycarbonates, Interscience Publishers, New York 1964".

Preferred other diphenols are, for example:
4,4'-dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
α,α',-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane,
α,α',-bis- (3,5-dimethyl-4-hydroxyphenyl) - p-diisopropylbenzene,
2,2-bis-(3,5-dichloro-4-hydroxyphenyl)-propane and
2,2-bis-(3,5-dibromo-4-hydroxyphenyl)-propane.

Especially preferred diphenols (VI) are, for example:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
1,1-bis-(4-hydroxyphenyl)-cyclohexane.
2,2-bis-(4-hydroxyphenyl)-propane is particularly preferred.

The other diphenols may be used both singly and as mixtures.

Conventional amounts of monofunctional compounds are used in a known manner as chain terminators for control of the molecular weight. Suitable compounds are, e.g. secondary amines, phenols and acid chlorides. Preferred are phenols, e.g. t-butyl phenols or other alkyl-substituted phenols. For the control of the molecular weight, small amounts of phenols (VII) are particularly preferred:

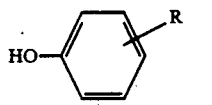

(VII)

wherein R represent a branched $C_8$- and/or $C_9$-alkyl group. In the alkyl group R, it is preferred that the proportion of $CH_3$—protons is from 47 to 89% and the proportion of $CH$— $CH_2$—protons is from 53 to 11 %; R in the 0- and/or p-position to the OH group is also preferred, and especially preferred is the upper limit of 20% for the proportion of ortho.

Some especially suitable phenols are phenol, p-t-butylphenol, hydroxydiphenyl, p-cumylphenol and particularly 3,5-dimethylheptylphenol and m- and p-1,1,3,3-tetramethyl-butylphenol. More especially preferred is the p-1,1,3,3-tetramethylbutylphenol. The chain-terminator is generally used in amounts of from 0.1 to 10, preferably from 0.5 to 8, mole %, based on the diphenols used.

The present polycarbonates, which also find application according to the present invention for thermoplastic processing to mouldings, are also to be understood to include any mixtures of at least two polycarbonates, provided that they meet the above requirements for the type and ratio of the bivalent carbonate structural units (I) and (V) and for the average molecular weight $m_w$. Preferred, however, are polycarbonates the composition of which is determined by the synthesis, and which are thus not obtainable by subsequent mixing. The polycarbonates according to the present invention may be produced by the phase interface method (of. H. Schell, "Chemistry and Physics of Polycarbonates", Polymer Reviews, Vol. IX, pages 33 ff., Interscience Publ., 1964) in a known manner.

In this process the diphenols (II) are dissolved in aqueous alkaline phase. For the production of co-polycarbonates with other diphenols, mixtures of diphenols (II) and the other diphenols, for example (VI), are used. For control of the molecular weight, chain-terminators, e.g. (VII), may be added. Reaction with phosgene is then carried out in presence of an inert organic phase, which is preferably a solvent for polycarbonate, by the interfacial condensation method. The reaction temperature is generally from 0° to 40° C.

Alongside the diphenols (II) to be used and the other diphenols (VI), the mono- and/or bis-chloroformate esters thereof may also be used, these being added as a solution in organic solvents. The quantity of chain-terminators depends on the moles of diphenolate structural units (II) and possibly of the other diphenolate structural units, for example (VI); also, by the use of chloroformate esters, the amount of phosgene may be reduced correspondingly in a known manner. As organic phase for the interfacial polycondensation, as well as organic solvent for the solution of the chain-terminators and possibly the chloroformate esters, these may be used, for example, chlorinated hydrocarbons, such as chloroform, dichloroethane, di- and tetrachloroethylene, tetrachloroethane, methylene chloride, chlorobenzene and dichlorobenzene, but also nonchlorinated hydrocarbons, such as toluene and xylene, as well as mixtures of these solvents, in particular mixtures of methylene chloride and chlorobenzene. The chain-terminators used may possibly be dissolved in the same solvent.

As organic phase for the interfacial polycondensation, for example methylene chloride, chlorobenzene or toluene, as well as mixtures of methylene chloride and chlorobenzene, may be used.

As aqueous alkaline phase, for example aqueous NaOH solution or KOH solution, may be used.

The production of the polycarbonates according to the present invention by the interfacial process may be catalyzed in the conventional way using catalysts, such as tertiary amines and phase transfer catalysts, in particular tertiary aliphatic amines, such as tributylamine, triethylamine, N-ethylpiperidine and, in particular, quaternary ammonium and phosphonium compounds such as tetrabutylammonium bromide and triphenylbenzylphosphonium bromide; the catalysts are generally used in amounts of from 0.05 to 30 mole %, based on the moles of diphenols used. The catalysts are generally added before the beginning of the phosgenation or during or even after the phosgenation.

The polycarbonates according to the present invention are separated in a known manner from the primary reaction product, e.g. by separating the organic phase obtained in the interfacial polycondensation, containing the dissolved polycarbonate, washing it neutral and electrolyte-free, and then recovering the polycarbonate, for example using an evaporator-extruder as granular material, or by precipitation with a non-solvent, followed by drying, or by spray evaporation as powder or as pellets.

To the polycarbonates according to the present invention may be added, before or during processing, the conventional additives for thermoplastic polycarbonates such as stabilizers, mould release agents, pigments, flame retardants, antistatic agents, conductivity additives, fillers and reinforcing substances, in the usual amounts.

More specifically, for example graphite, carbon black, metal fibres, metal powder, kieselguhr, quartz, kaolin, mica, clays, $CaF_2$, $CaCO_3$, aluminium oxides, aluminium nitride, silicates, barium sulphate, glass fibres, carbon fibres, ceramic fibres and inorganic and organic pigments, may be added, and as mould-release agents, for example, esters of polyhydric alcohols having long-chain carboxylic acids, such as glyceryl stearates, pentaerythritol tetrastearate and trimethylolpropane tristearate.

The polycarbonates according to the present invention may be processed thermoplastically to mouldings, e.g. by injection moulding, extrusion, blow moulding or drawing, during which the above-mentioned additives may be added. Mouldings are to be understood to include, e.g. injection-moulded mouldings, extruded mouldings, such as profiles, tubes, sheets fibres and films, blow-mouldings, such as bottles, canisters and light fittings, as well as, e.g., deep-drawn mouldings from sheets and films.

The films may be processed in combination with other films to laminated films. Furthermore, the blends according to the present invention may also be used in other composite materials, e.g. in combination with fibres and other polymers.

Mouldings produced from the polycarbonates according to the present invention may be used advantageously, for example, in the electrical sector, as well as in the building sector when high deflection temperature with simultaneously good toughness is required.

The present blends with polycarbonates based on substituted cyclohexylidenebisphenols (A) show important advantages compared with previously-known blends with polycarbonates. They possess simultaneously high heat deflection temperature, good flowability of the melt and high temperature stability, even under the influence of atmospheric oxygen. They exhibit non-Newtonian flow behavior, which facilitates injection moulding and extrusion processing; injection moulded parts are easily extracted from the mould. The blends are also very tough, with especially high tracking resistance, hydrolytically stable and stable towards UV and gamma radiations. Furthermore, they have a high gas permeability and a high selectivity for gas separations, for example for the separation of carbon dioxide/oxygen mixtures.

The thermoplastic blends according to the present invention preferably contain from 5 to 98 weight %, more preferably from 10 to 95 weight % and particularly from 20 to 90 weight %, of at least one thermoplastic aromatic polycarbonate (A) having difunctional carbonate structural units (I). They may contain from 0 to 90 weight %, more preferably from 0 to 75 weight % particularly from 0 to 60 weight %, of at least one amorphous thermoplastic (B). They may contain from to 90 weight %, more preferably from 0 to 75 weight %, particularly from 0 to 60 weight %, of at least one partially crystalline thermoplastic (C). They may contain from 0 to 90 weight %, more preferably from 0 to 75 weight %, particularly from 0 to 60 weight %, of at least one graft polymerisate (E). In addition, they may contain from 0 to 80 weight %, more preferably from 0 to 60 weight %, especially from 0 to 45 weight %, particularly from 0 to 30 weight % of at least one rubber (D).

In the thermoplastic blends according to the present invention, the sum of the rubber (D) and the rubber component of the graft polymerisate (E) preferably amounts to from 0 to 80 weight %, more preferably from 0 to 60 weight %, especially from 0 to 45 weight %, particularly from 0 to 30 weight %.

The thermoplastic blends according to the present invention may contain, in addition to at least one thermoplastic aromatic polycarbonate (A) having difunctional carbonate structural units (I), one or more constituents selected from (B), (C), (D) and (E).

Especially preferred blends are thermoplastic blends obtained from at least one thermoplastic polycarbonate (A) having difunctional carbonate structural units (I) and from 1 to 99 weight % of at least one amorphous thermoplastic (B), or from 1 to 99 weight % of at least one graft polymerisate (E). Blends of components (A) and (B) are particularly preferred.

Especially preferred blends also are those of at least one thermoplastic polycarbonate (A) having difunctional carbonate structural units (I), from 1 to 98 weight %, preferably from 20 to 75 weight %, particularly from 3% to 60 weight %, of at least one partially crystalline thermoplastic having a melting point of from 60 to 400 C (C) and from 1 to 98 weight %, preferably from 1% to 35 weight %, particularly from 15 to 25 weight %, of at least one graft polymer of at least one rubber and at least one grafted polymer (E).

Especially preferred blends are thermoplastic blends of at least one thermoplastic polycarbonate (A) having difunctional carbonate structural units (I), from 1 to 98 weight %, preferably from 10 to 70 weight %, particularly from 20 to 60 weight %, of at least one amorphous thermoplastic (B) having a glass transition temperature of from 40 to 300 C and from 1 to 98 weight preferably from 10 to 80 weight %, particularly from 20 to 60 weight %, of at least one graft polymerisate of at least one rubber and at least one grafted polymer (E).

Especially preferred also are thermoplastic blends of at least one thermoplastic polycarbonate (A) having difunctional carbonate structural units (I), from 1 to 98 weight %, preferably from to 80 weight %, particularly from 20 to 70 weight %, of at least one amorphous thermoplastic (B) having a glass transition temperature of from 40° to 300° C. and from 1 to 60. Weight preferably from 1 to 20 weight %, particularly from 2 to 5 weight %, of at least one rubber (D).

The amorphous thermoplastic (B) preferably have a glass transition temperature of from 50° to 280° C. more preferably from 60° to 250° C., particularly from 80° to 230° C.

The partially crystalline thermoplastics (C) preferably have melting points of from 70° to 350° C., more preferably from 80° to 320° C., particularly from 100° to 300° C.

Examples of amorphous thermoplastics to be used according to the present invention as blend constituent (B) are aromatic polycarbonates without difunctional carbonate structural units (I), aromatic polycarbonates without difunctional carbonate structural units (I) with inserted polysiloxane blocks, inserted aliphatic polyether blocks or inserted aliphatic polyester blocks, aromatic polyesters, aromatic poly(ester carbonates) without difunctional carbonate structural units (I), aliphatic-aromatic polyesters, polyamides, poly(arylene sulphones), aromatic polyethers, aromatic polyimides, polyepoxides, vinyl polymers and (meth)acrylic polymers.

Preferred are the aromatic polycarbonates and poly(ester carbonates) without difunctional carbonate structural units (I) with inserted polysiloxane blocks, aromatic polyesters, aliphatic-aromatic polyesters, polyamides and vinyl polymers and especially the aromatic polyesters, the aromatic poly(ester carbonates) without difunctional carbonate structural units (I), the polyamides and the vinyl polymers.

According to the present invention, aromatic polycarbonates without difunctional carbonate structural units (I) may be used as constituent (B) of the blend. Such polycarbonates contain only difunctional carbonate structural units (V), which are based on bisphenols (VI). Homopolycarbonates obtained from only one bisphenol or copolycarbonates obtained from at least two bisphenols may be used. As regards molecular weight, branching agent, chain terminators and production methods for polycarbonates (A) having carbonate structural units (I) applies.

As constituent (B) of the blend, there may also be used polycarbonate-polysiloxane block copolymers in which the polycarbonate component is built-up from at least one aromatic bisphenol (VI). The polysiloxane blocks may, for example, be incorporated into the polycarbonatepolysiloxane block copolymer by also introducing polysiloxanes having Cl or bisphenol end groups into the polycarbonate reaction, for example by the two-phase interfacial process. Such polysiloxanes are, for example, polydimethylsiloxanes corresponding to the general formulae (VIII) and (IX):

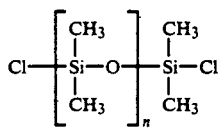

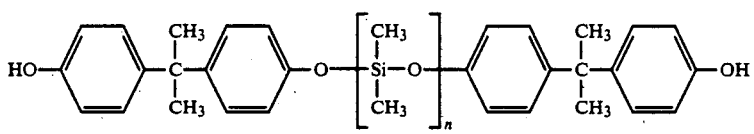

having average degrees of polycondensation of n=5 to 200. Such usable polysiloxane blocks and others have often been described in the literature. The siloxane content of the polycarbonate-polysiloxane block copolymers may be varied within wide limits, e.g. from 0.1 to 80 weight %, according to the properties desired from the block copolymers. The production of suitable polysiloxane blocks which may be incorporated into the polycarbonate and the synthesis of polycarbonatepolysiloxane copolymers is described, for example, in U.S. Pat. No. 189,662, DE-PS 1,595,790, DE-PS 2,411,123, DE-OS 2,411,363, Ep-A-216 106 and DE-OS 3,506,472.

As constituent (B) of the blend may also be used, for example, polycarbonate-polyether block copolymers and polycarbonate-polyester block copolymers having aliphatic polyether blocks, e.g. poly(ethylene oxide), poly(propylene oxide) and, preferably, poly(butylene oxide) blocks, or with aliphatic polyester blocks, e.g. hexane diol-adipic acid polyester or hexane diol-dimer fatty acid polyester. Block copolymers of this type and the production thereof are described in DE-OS 2,636,783; 2,2,636,784; 2,827,325; 2,726,376; 2,726,416; 2,726,417; 2,712,435 and 2,702,626.

Aromatic polyesters and poly(ester carbonates) usable according to the present invention as constituent (B) of the blend are built-up from at least one aromatic bisphenol acid and possibly also carbonic acid. Suitable aromatic dicarboxylic acids are, for example, orthophthalic acid, terephthalic acid, isophthalic acid, t-butylisophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenylether dicarboxylic acid, 4,4'-diphenylsulphone dicarboxylic acid, 2,2-bis-(4-carboxyphenyl)-propane, trimethyl-3-phenylindane-4,'5-dicarboxylic acid.

Of the aromatic dicarboxylic acids, the use of terephthalic acid and/or isophthalic acid is especially preferred. For the bisphenols, the preferences mentioned in connection with (VI) apply.

Aromatic polyesters and poly(ester carbonates) may be produced by processes such as are known for the production of polyesters and poly(ester carbonates) in the literature, e.g. by processes in homogeneous solution, by melt transesterification processes and by the two-phase interfacial process. Preferably, melt transesterification processes and especially the two-phase interfacial process are used.

Melt transesterification processes (acetate process and phenyl ester process) are described, for example, in U.S. Pat. Nos. 3,494,885; 4,386,186; 4,661,580; 4,680,371 and 4,680,372, EP-A-26 120, 26 121, 26 684, 28 030, 39 845, 91 602, 97 970, 79 075, 146 887, 156 103, 234 913, 234 919 and 240 301, and DE-AS 1,495,626 and 2,232,877. The two-phase interfacial process is described, for example, in EP-A-68 014, 88 322, 134 898, 151 750, 182 189, 219 708 and 272 426, DE-OS 2,940,024; 3,007,934 and 3,440,020 and in Polymer Reviews, Volume 10, Condensation Polymers by Interfacial and Solution Methods, Paul W. Morgan, Interscience Publishers New York, 1965, Chapter VIII, page 325, Polyesters.

In general, in the acetate process, bisphenol diacetate or bisphenol and acetic anhydride together with aromatic dicarboxylic acids are condensed to polyesters with elimination of acetic acid.

In general, in the phenyl ester process, bisphenol, aromatic dicarboxylic acids or diphenyl esters of the aromatic dicarboxylic acids and possibly diphenyl carbonate are reacted to polyester or poly(ester carbonate) with elimination of phenol and possibly CO₂.

In general, in the two-phase interfacial process, the starting materials used for the production of polyesters or poly(ester carbonates) are alkali metal bisphenolate, aromatic dicarboxylic acid dichloride and possibly phosgene. In this condensation reaction, the polyester or polyester polycarbonate is produced with formation of alkali metal chloride.

In general, the salt formed is dissolved in the aqueous phase, while the polyester or poly(ester carbonate) formed is present in solution in the organic phase and is isolated therefrom.

Aliphatic-aromatic polyesters which may be used as constituent (B) of the blend are, for example, amorphous polyesters of cyclohexane-1,4-dimethanol and terephthalic acid and/or isophthalic acid, which may also contain as comonomers other dicarboxylic acids and aliphatic dihydroxy compounds condensed in, e.g. glycol, propylene glycol and butylene glycol. Examples of such polyesters are cyclohexane-1,4-dimethanol-terephthalic acid polyester, cyclohexane-1,4-dimethanol-terephthalic acid-isophthalic acid copolyester and cyclohexane-1,4-dimethanol-terephthalic acid-ethylene glycol copolyester. Such polyesters are described, for example, in EP-A-273 151, 273 152, 155 989, 225 974, 185 309, 152 825, 226 189 and 272 416, and U.S. Pat. Nos. 4,188,314 and 4,634,737.

Amorphous thermoplastic polyamides which may be used as constituent (B) of the blend may, for example, be obtained by polycondensation of diamines, such as ethylene diamine, tetramethylene diamine, hexamethylene diamine, hexamethylene diamine, decamethylene diamine, 2,2,4- and 2,4,4-trimethylhexamethylene diamine, m- and p-xylylene diamine, bis-(4-aminocyclohexyl)-methane, mixtures of 4,4,- and 2,2,-diaminodicyclohexylmethanes, 2,2-bis-(4-aminocyclohexyl)-propane, 3,3'-dimethyl-4,4',-diamino-dicyclohexylmethane, 3-aminothyl-3,5,5-trimethyl-cyclohexylamine, 2,5-bis-(aminomethyl)-norbornane, 2,6-bis-(aminomethyl)-norbornane, and 1,4-diaminomethylcyclohexane, and from mixtures of these diamines with dicarboxylic acids, such as with oxalic acid, adipic acid, azelaic acid, decane dicarboxylic acid, heptadecane dicarboxylic acid; 2,2,4-trimethyladipic acid, 2,4,4-trimethyladipic acid, isophthalic acid and terephthalic acid, and with mixtures of these dicarboxylic acids. Amorphous copolyamides which are obtained by polycondensation of several of the aforementioned diamines and/or dicarboxylic acids are thus included also. Also included are amorphous copolyamides which are produced by the use together of ω-aminocarboxylic acids, such as ω-aminocaproic acid, ω-aminoundecanoic acid or o aminolauric acid or of the lactams thereof.

Especially suitable amorphous thermoplastic polyamides are those obtainable from isophthalic acid, hexamethylene diamine and other diamines, such as 4,4'-diaminodicyclohexylmethane, isophorone diamine, 2,2,4-and/or 2,4,4-trimethylhexamethyldiamine, 2,5- and/or 2,6-bis-(aminomethyl)-norbornane, those obtainable from isophthalic acid, 4,4'-diaminodicyclohexylmethane and ω-caprolactam, those obtainable from isophthalic acid, 3,3'-dimethyl-4,4'-diamino-dicyclohexylmethane and ω-lauric lactam, and those obtainable from terephthalic acid and 2,2,4- and/or 2,4,4-trimethylhexamethylene diamine.

Instead of pure 4,4,-diaminodicyclohexylmethane, mixtures of the diaminodicyclohexylmethane positional isomers may also be used, composed of:
from 70 to 99 mole % of the 4,4'-diamino isomers
from 1 to 30 mole % of the 2,4'-diamino isomers
from 0 to 2 mole % of the 2,2'-diamino isomers
and possibly corresponding higher condensed diamines which are obtained by hydrogenation of diaminodiphenylmethane of technical quality.

The amorphous polyamides and the production thereof are known (see for example Ullman, Enzyklopodie der Technischen Chemie, volume 19, page 50).

Polyarylene sulphones which may be used as constituent (B) of the blend generally have average molecular weights $\overline{m}_w$ (weight average; measured by the light scattering method in CHC13) of from 10,000 to 200,000, preferably from 20,000 to 90,000. Examples of these are the polyarylene sulphones obtainable by known processes from 4,4'-dichlorodiphenylsulphone and at least one bisphenol, in particular 2,2-bis-(4-hydroxyphenyl)-propane and bis-(4-hydroxyphenyl)-sulphone, which, for example, lead to polyarylene sulphones having difunctional sulphone structural units (X) and (XI):

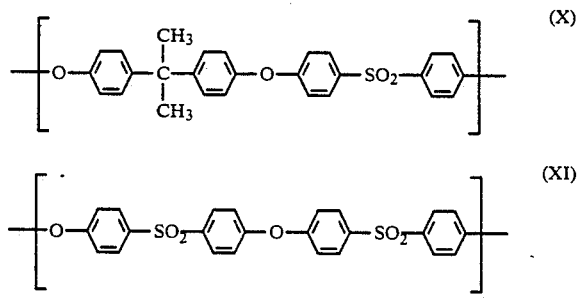

These polyarylene sulphones are known (see, for example, U.S. Pat. No. 3,264,536, DE-AS 1,794,171, GB Patent 1,264,900, U.S. Pat. No. 3,641,207, EP-A-00 38 028, DE-OS 3,601,419 and DE-OS 3,601,420, EP 149 359, EP 294 473 and the publications G. Blinne et.al., Kunststoffe 75/I (1985) 29–34 and R.N. Johnson et.al. Journal of Polymer Science, Part Al, 5 (1967) 2375–2398). The suitable polyarylene sulphones may also be in known manner (see, for example, DE-OS 2,305,413).

Aromatic polyethers which according to the present invention may find application as constituent (B) of the blend are, for example, polyphenylene oxides. Polyphenylene oxides are known and are described, for example, in U.S. Pat. Nos. 3,306,874; 3,306,875; 3,257,357; 3,257,358; 3,661,848; 3,219,625; 3,378,505; 3,639,656; 4,011,200 and 3,929,930, Ep-A-0 248 526, 0 271 699 and DE-OS 2,126,434. The molecular weights $\overline{m}_w$ (weight average) are generally from 10,000 to 80,000, preferably from 15,000 to 60,000.

Polyphenylene oxides are generally obtained as homo- or co-polymers by an oxidative coupling reaction of one or more doubly- or triply-substituted phenols. A copper-amine complex generally serves as catalyst for the reaction. Copper-amine complexes of primary, secondary and/or tertiary amines may be used. Examples of suitable homopolyphenylene oxides are:
poly-(2,3-dimethyl-6-ethylphenylene-1,4-ether),
poly-(2,3,6-trimethylphenylene-1,4-ether),
poly-(2,4'-methylphenylphenylene-1,4-ether),
poly-(2-bromo-6-phenylphenylene-1,4-ether), poly-(2-methyl-6-phenylphenylene-1,4-ether),
poly-(2-phenylphenylene-1,4-ether), especially preferred epoxide wherein n may, for example, be from 5 to 200:

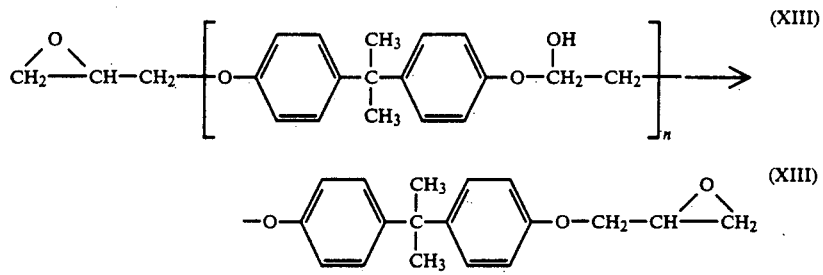

poly-(2-chlorophenylene-1,4-ether),
poly-(2-methylphenylene-1,4-ether),
poly-(2-chloro-6-ethylpheylene-1,4-ether),
poly-(2-chloro-6-bromophenylene-1,4-ether),
poly-(2,6-di-n-propylphenylene-1,4-ether),
poly-(2-methyl-6-isopropylphenylene-1,4-ether),
poly-(2-chloro-6-methylphenylene-1,4-ether),
poly-(2-methyl-6-ethylphenylene-1,4-ether),
poly-(2,6-dibromophenylene-1,4-ether),
poly-(2,6-dichlorophenylene-1,4-ether),
poly-(2,6-diethylphenylene-1,4-ether),
0 poly-(2,6-dimethylphenylene-1,4-ether).

Suitable copolymeric polyphenylene oxides may be produced, e.g., from two or more phenols which are used for the production of the above-listed homopolyphenylene oxides.

The poly-(2,6-dimethylphenylene-1,4-ether) is especially preferred. Graft and block copolymers of polyphenylene oxides and polyvinyl aromatics, such as polystyrene, are also suitable as blend constituent (B). Suitable styrene-grafted polyphenylene oxides are described, for example, in the publication "Xyron", Japan Plastics Age, March/April 1979, pp. 29–33.

Aromatic polyimides which may be used as blend constituent (B) of the blend are aromatic poly(ether imides), such as are described in U.S. Pat. Nos. 4,395,518 and 3,855,178, Ep-A-120 183, 120 184, 179 471, 292 243 and 278 066, DE-PS 2,735,501 and the publications Poly(ether imide), Kunststoffe-Plastics 4/1982, pp. 3235, Poly(ether imides), Kunststoffe 73/5 (1983), pp. 266–269, R.O. Johnson and H.S. Burlhis, J. of Pol. Sc., Polymer Symp. 70 (1983), pp. 129–143 and D.M. White et. al. J. of Pol. Sc., Pol. Chemistry Ed., 19 (1981), pp. 1635–1685. The synthesis of these poly(ether imides) may, as described there, be carried out, for example, by reaction of bis-nitro-bis-phthalimides and alkali metal bisphenolates with elimination of alkali metal nitrile or by reaction of bis-ether-bis-phthalic acid anhydrides and diamines with elimination of water. A preferred aromatic poly(ether imide) is, for example, that having repeating units (XII):

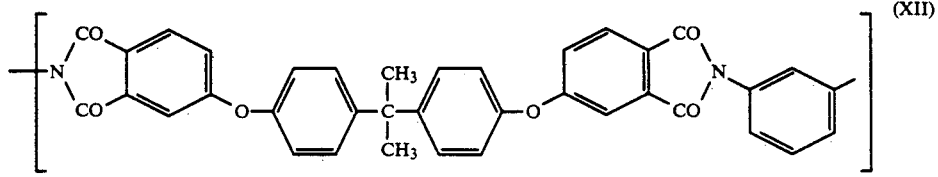

Polyepoxides which may be used as blend constituent (B) are, for example, polyepoxides, such as may be produced from epichlorhydrin and bisphenols, e.g. bisphenol A, by known methods. Formula (XIII) shows an Vinyl polymers and (meth)acrylic polymers, such as may be used as blend constituent (B) are homo- and copolymers, for example of the following monomers: a
(1) Styrene and derivatives thereof, such as α-methylstyrene, α-chlorostyrene, p-methylstyrene, 3,4-dimethylstyrene, and p-divinylbenzene, p-methyl-2-α-methylstyrene, and p-chloro-α-methylstyrene, preferably styrene and α-methystyrene.
(2) Acrylic and methacrylic compounds, such as acrylic and methacrylic acids, acrylonitrile, methacrylonitrile, methyl acrylate, ethyl acrylate, and iso-propyl acrylate, D- and iso-butyl acrylate, t-butyl acrylate, 2-ethylhexyl acrylate, methyl methacrylate, ethyl methacrylate, D- and iso-propyl methacrylate, n- and iso-butyl methacrylate, t-butyl methacrylate, cyclohexyl methacrylate and isobornyl methacrylate, preferably acrylonitrile, methacrylonitrile, methyl methacrylate and t-butyl methacrylate.
(2) Maleic anhydride and derivatives thereof, such as maleic acid esters, maleic acid diesters and maleimides, e.g. alkyl- and aryl-maleimides, such as methyl- or phenyl-maleimide, preferably maleic anhydride and maleimides, in particular phenyl maleimides.

The monomers (3) generally serve as comonomers for monomers (1) and (2).

Examples of suitable homo- and co-polymers are polystyrene, poly(methyl methacrylate), styrenemethylstyrene copolymers, styrene-acrylonitrile copolymers, (α-methylstyrene)-acrylonitrile copolymers, styrene-(maleic anhydride) copolymers, styrene-phenyl maleimide copolymers, styrene-(methyl methacrylate) copolymers, (methyl methacrylate)-acrylonitrile copolymers, styrene-acrylonitrile-(maleic anhydride) copolymers, styrene-acrylonitrile-phenyl maleimide copolymers, (α-methylstyrene)-acrylonitrile-(methyl methacrylate) copolymers, (α-methylstyrene)-acrylonitrile-(t-butyl methacrylate) copolymers and styrene-acrylonitrile-(t-butyl methacrylate) copolymers.

The vinyl polymers and (meth)acrylic polymers may be produced by known radical, anionic and cationic polymerisation processes. The known redox polymerisation or the known polymerisation with metalloorganic mixed catalysts may also be advantageous. The polymerisation may occur in bulk, solution or emulsion, as is known.

Mixed processes, such as solution, precipitation or bulk suspension processes, may be used, as is known. The weight-average molecular weights of the vinyl polymers and the (meth)acrylic polymers are generally from 10,000 to 300,000, preferably from 30,000 to 200,000.

Examples of the partially crystalline thermoplastics usable according to the present invention as blend constituents are polyolefins, ionomers, aliphaticaromatic polyesters, polyamides, aromatic poly(ether ketones) and poly(phenylene) sulphides). Especially, preferred are aliphatic-aromatic polyesters and the polyamides, especially the aliphatic polyesters.

As blend constituent (C), partially crystalline polyolefins are usable according to the present invention. Such polyolefins are, for example, homo- and co-polymers of olefins, such as ethylene, propylene, butene-I, pentene-I, hexene-1, heptene-1, 3-methylbutene-1, 4-methylbutene-1, 4-methylpentene-1, octene-1 and others. Some such polyolefins are polyethylene, polypropylene, polybutene-1 and poly-4-methylpentene-1.

With polyethylene, a distinction is made between PE, HDPE (high density), LDPE (low density) and LLDPE (very low density). The differing densities of the polyethylenes arise through different processes and co-condensation with other monomers, as is known. Known processes for the production of polyolefins are, e.g., the high pressure process and the low pressure process (Ziegler-Natta catalysis with metallo-organic mixed catalysts).

Preferred blend constituents (C) are polyethylene and poly-4-methylpentene-1, polyethylene being especially preferred. The polyolefins may contain, besides the olefins, minor amounts of other monomers.

Ionomers are also suitable according to the present invention as blend constituent (C). These are, in general polyolefins, as described above, especially, polyethylene, which contain co-condensed monomers having acid groups, such as acrylic acid and methacrylic acid. The acid groups are converted with the aid of metal ions, such as $Na^+$, $Ca^{2+}$, $Mg^+$, and $Al^{3+}$, into ionic, and possibly ionically-crosslinked, polyolefins, which, however, may still be processed thermoplastically. Such polymers are, for example, ethylene-(acrylic acid) copolymers whose acid groups have been converted to metal-salt-like groups. Such ionomers are described, e.g., in U.S. Pat. Nos. 3,264,272; 3,404,134; 3,355,319 and 4,321,337.

Aromatic-aliphatic polyesters which may be used as partially crystalline blend constituent (C) are preferably poly(alkylene terephthalates), for example those based on ethylene glycol, propanediol-1,3, butanediol-1,4, hexanediol-I,6 and 1,4-bis-hydroxymethylcyclohexane. Especially preferred for use are poly(butylene terephthalates), poly(ethylene terephthalates), and copolymers of cyclohexane-1,4-dimethanol and ethylene glycol with terephthalic acid, so far as these are partially crystalline.

The molecular weights $\overline{M}_w$ (weight average) of these poly(alkylene terephthalates) are generally 10,000 to 200,000, preferably from 10,000 to 80,000. The poly(alkylene terephthalates) may be obtained by known processes, for example from terephthalic acid dialkyl esters and the corresponding diol by transesterification (see e.g. U.S. Pat. Nos. 2,647,885; 2,643,989; 2,534,028; 2,578,660; 2,742,494 and 2,901,466).

Partially crystalline polyamides which are suitable as blend constituent (C) are in particular polyamide 6, polyamide 66, polyamide 46 and partially crysalline copolyamides based on these components. Furthermore, partially crystalline polyamides includes those whose acid components consist completely or partially (e.g. in addition to α-caprolactam) of in particular adipic acid and/or terephthalic acid and/or isophthalic acid and/or suberic acid and/or sebacic acid and/or azelaic acid and/or dodecane dicarboxylic acid and/or a cyclohexane dicarboxylic acid, and whose diamine components consist completely or in partial of in particular m- and/or p-xylene diamine and/or hexamethylene diamine and/or 2,2,4- and/or 2,4,4- trimethylhexamethylene diamine and/or isophorone diamine, and whose blends are known in principle in the art (see, for example, Encyclopaedia of Polymers, Vol. 11, p. 315 ff).

Also suitable are partially crystalline polyamides which are produced wholly or partially from lactams having from 6 to 12 carbon atoms, possibly together with the use of one or more of the above-mentioned starting components.

Especially preferred partially crystalline polyamides are polyamide 6 and polyamide 66 or copolyamides with a small proportion, e.g, up to about 10 weight %, of other components.

As partially crystalline blend constituent (C), aromatic poly(ether ketones) may also be used, which are described, for example, in GB 1,078,234, US 4,010,147, EP 135 938, 292 211, 275 035, 270 998 and 165 406 and JA 62 151 421 and in the publications C.K. Sham et.al., Polymer 29/6 (1988), pp. 1016–1020, and J.E. Harris et. al., J. Appl. Polym. Sc. 35/7 (1988), pp. 1877–1891. These poly(ether ketones) may be obtained, for example, by reacting bisphenols with bis-(halogenoaryl)-ketones in polar aprotic solvents in presence of alkali metal carbonates. So, for example, polymers having difunctional structural units (XIV) may be obtained by reaction of hydroquinone with 4,4'-difluorobenzophenone; polymers having difunctional structural units (XVI) 0 by reaction of bis-(4-hydroxyphenyl)ketone with 4,4'-difluorobenzophenone:

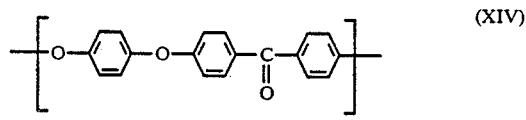

(XIV)

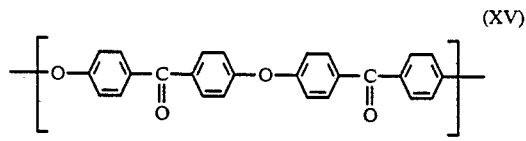

(XV)

These polymers are poly(ether ketones) which are preferred for use.

Polymers which may also be used as partially crystalline blend constituent (C) are thermoplastic linear or branched poly(arylene sulphides). They have structural units corresponding to the general formula (XVI)

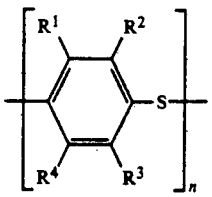

(XVI)

wherein $R^1$ and $R^4$ independently represent H, $C_1$–$C_6$-alkyl, phenyl or hydrogen and n is sn integer providing for a molecular weight of about 500 to about 80 000. The poly(arylene sulphides) may also contain diphenyl units. Most important is the poly(arylene sulphide) wherein $R^1$ and $R^4$ represent H. Poly(arylene sulphides) and the production thereof are known and are described, for example, in U.S. Pat. Nos. 3,354,129; 3,786,053; 3,853,824; 3,856,560 and 3,862,095 and 3,862,095 and EP-A-0 171 021, as well as in the publications W. Baerecke, International Polymer Science and Technology, Vol. 1, No. 9, 1974, pp. T/52 –T/54, and A. S. Wood, Mod. Plast. Int. 4 (1988), pp. 34–37.

As rubbers (D), thermoplastic rubbers may be used. Such thermoplastic rubbers are, for example, thermoplastic polyurethanes, poly(ether esters), poly(ester amides), poly(ether amides), thermoplastic olefin elastomers, ethylene-(ethyl acrylate) copolymers, styrene-butadiene segment polymers, styrene-isoprene segment polymers and hydrogenated styrene-butadiene segment polymers. Preferred are thermoplastic polyurethanes, poly(ether esters) and, in particular, hydrogenated styrene-butadiene segment polymers.

The thermoplastic polyurethanes are produced, for example, from three components, from long-chain bifunctional polyols, short-chain diols or diamines and diisocyanates. The reaction of the three components occurs, e.g., at starting temperatures of from 60° to 140° C. with strong agitation. The isocyanate groups react with the hydroxyl groups with formation of urethane groups without splitting-off of by-products. After comminution and several days' storage, the elastomer may be processed thermoplastically. Suitable long-chain diols are, for example ethane diol polyadipate, butane diol-1,4 polyadipate, ethane diolbutanediol polyadipate, hexane diol-1,6-(neopentyl glycol) polyadipate, propylene glycol(1,2) polyethers, tetramethylene oxide (=tetrahydrofuran polyether), hexane diol-1,6 polycarbonate and polycaprolactone. Suitable short-chain diols or diamines (chain-extenders) are, e.g., ethane diol, butane diol-1,4, hexane diol-1,6,hydroquinone di-β-hydroxyethyl-ether and isophorone diamine.

Suitable short-chain diols or diamines (chain-extenders) are, e.g., ethane diol, butane diol-1,4, hexane diol-1,6, hydroquinone di-β-hydroxyethyl-ether and isophorone diamine.

Suitable diisocyanates are, for example, 4,4,-diphenylmethane diisocyanate (MDI), hexamethylene diisocyante (HDI, isophorone diisocyanate (IPDI) and 1,5-naphthalene diisocyanate (NDI).

The thermoplastic polyurethanes and the production thereof are described in the publication W. Goyert et. al., Kunststoffe 68, Jahrgang 1978, pp. 2-8, in the monograph J. H. Saunders et.al., Polyurethanes, Chemistry and Technology, Vol. II, pp. 299–451, Interscience Publishers, New York, 1964, and in U.S. Pat. No. 2,729,618 and U.S. Pat. No. 3,214,411.

Suitable poly(ether esters) are, for example, block copolymers having soft segments, such as poly (tetramethylene glycol terephthalate), poly(propylene glycol terephthalate) or poly(ethylene glycol terephthalate), and hard segments of poly(butylene terephthalate), such as are described, e.g., in J. W. Crary, GAK 7/1986, Jahrgang 39, pp. 330–334, and G. K. Hoeschele, Chimica 28/9 (1974), pp. 544–552.

Suitable poly(ester amides) and poly(ether amides) are for example, described in EP-A-126 928, DE-OS 2,523,991, EP-A-281 461 and the publication Kunststoffe 72/5 (1982) pp. 282–283. There are block copolymers of polyether segments, such as poly(ethylene glycol), poly (propylene glycol) and poly(butylene glycol), and polyamide segments, such as PA 6, PA 66, PA 11, PA 12, PA 611 and P 612.

Suitable styrene-butadiene, styrene-isoprene and hydrogenated styrene-butadiene segment polymers are described, for example, in U.S. Pat. Nos. 3,333,024; 3,753,936 and 3,281,383, DE-PS 2819,493, and DE-OS 2,613,200 and 2,643,757. Preferred are tho SEBS block copolymers and the hydrogenated SEBS block copolymers (SEBS=styrene-ethylene-butylene-styrene block copolymer).

As rubbers (D), rubbers other than the above-mentioned thermoplastic rubbers may also be used. Such rubbers are, for example, natural rubber, epichlorhydrin rubbers, ethylene-(vinyl acetate) rubbers, chlorosulphonated polyethylene rubbers, silicone rubbers, polyether rubbers, diene rubbers, hydrogenated diene rubbers, polyalkenamer rubbers, acrylate rubbers, ethylene-propylene rubbers, ethylene-propylene-diene rubbers, butyl rubbers and fluororubbers. Preferred and silicone rubbers, diene rubbers, hydrogenated diene rubbers, acrylate rubbers and ethylene-propylene-diene rubbers (the diene being, e.g., dicyclopentadiene, ethylidene norbornene or hexadiene-1,4).

Diene rubbers are, for example, homopolymers of conjugated dienes having from 4 to 8 carbon atoms, such as butadiene, isoprene, piperylene and chloroprene, copolymers, copolymers of such dienes with each other and copolymers of such dienes with styrene, acrylic or met hacrylic compounds (e.g. acrylonitrile, methacrylonitrile, acrylic acid, methacrylic acid, butyl acrylate and methyl methacrylate).

Especially preferred diene rubbers are butadiene, butadiene-styrene, butadiene-(methyl methacrylate), butadiene-(butyl acrylate) and butadiene-acrylonitrile rubbers. Acrylate rubbers are, for example, alkyl acrylate rubbers based on one or more $C_1$–$C_8$ alkyl acrylates, in particular on ethyl, butyl, octyl, or 2-ethylhexyl acrylate. These alkyl acrylate rubbers may contain up to 30 weight % of copolymerized monomers, such as vinyl acetate, acrylonitrile, styrene, methyl methacrylate and vinyl ethers. These alkyl acrylate rubbers may further contain small amounts (up to 5 weight %) of copolymerized polyfunctional monomers having a cross-linking action. Examples are esters of unsaturated carboxylic acids with a polyol (preferably from 2 to 20 carbon atoms in the ester group, such as triallyl cyanurate, triallyl isocyanurate; divinyl compounds, such as divinylbenzene; esters of unsaturated carboxylic acids with unsaturated alcohols (preferably from 6 to 12 carbon atoms in the ester group), such as allyl methacrylate; phosphate esters, e.g. triallyl phosphate; and 1,3,5-triacryloylhexahydro-s-triazine. Especially preferred polyfunctional monomers are triallyl cyanurate, triallyl isocyanurate, triallyl phosphate and allyl methacrylate.

Other suitable acrylate rubbers are products which contain a cross-linked diene rubber of one or more conjugated dienes, such as polybutadiene, or a copolymer of a conjugated diene with an ethylenically unsaturated monomer, such as styrene and/or acrylonitrile, as core and an acrylate shell.

Suitable silicone rubbers may be, e.g., cross-linked silicone rubbers having units of the general formulae $R_2SiO$, $RSiO_{3/2}$, $R_3SiO_{1/2}$ and $SiO_{2/4}$, wherein R represents a monovalent group. The amounts of the individual siloxane units must at the same time be so calculated that, for 100 units of the formula $R_2SiO$, there are present from 0 to 10 molar units of the formula $RSiO_{3/2}$, from 0 to 1.5 molar units of the formula $R_3SiO_{1/2}$ and from 0 to 3 molar units of the formula $SiO_{2/4}$.

R may represent either, on the one hand, a monovalent saturated hydrocarbyl group having from 1 to 18 carbon atoms, a phenyl group or an alkoxy group, or, on the other hand, a group vulnerable to radical attack, such as a vinyl or mercaptopropyl group. It is preferred that at least 80 % of all groups R are methyl; especially preferred are combinations of methyl and ethyl or methyl.

Preferred silicone rubbers contain inserted units of groups vulnerable to radical attack, especially vinyl, allyl, halogeno or mercapto groups, preferably in amounts of from 2 to 10 mole %, based on all R groups.

They may, for example, be produced as described in EP-A-260 558.

Usable as graft polymers (E) in the present blends are graft polymerisates obtained by radical polymerization of at least one of monomer selected from the three groups listed above in the presence of at least one rubber (not a thermoplastic rubber). Preferred production processes are the emulsion, solution, bulk or suspension polymerization. Thus, the graft polymerisate may be produced, for example, by radical emulsion graft polymerization of the vinyl monomers in the presence of rubber latices at temperatures of from 50° to 90° C., while using water-soluble initiators, such as peroxodisulphate, or with the aid of redox initiators.

Rubbers may also be used which exist already in preformed shell-core rubber particles, consisting of two different rubbers. Thus, for example, the core may consist of a polybutadiene rubber or a silicone rubber and the shell of an acrylate rubber (see above and e.g. EP 260 558 core/shell of silicone/acrylate). By simple grafting or multiple stepwise grafting, one or more grafted shells may be applied to the rubber particles, and each grafted shell may have a different composition. In addition to the monomers to be grafted, polyfunctional cross-linking monomers or monomers containing reactive groups may be grafted simultaneously, in order to achieve certain effects in the blend (see e.g. EP-A-230 282, DE-OS 3,601,419 and EP-A-269 861).

The graft polymerisates (E) generally contain from 5 to 90 weight %, preferably from 20 to 85 weight %, rubber and from 95 to 10 weight %, preferably from 80 to 15 weight %, graft copolymerized monomers. The rubbers generally occur in these graft heteropolymerisates in the form of at least partially cross-linked particles of a mean particle size of from 0.05 to 5 microns, preferably from 0.1 to 2 microns, more preferably from 0.1 to 1 micron.

The monomers and rubbers mentioned as preferred or especially preferred for the vinyl polymers and (meth)acrylic polymers are also preferred or especially preferred for the graft polymerisates.

The present polymer blends may be produced in various ways. Thus, the starting polymers may be dissolved together in a solvent or solvent mixture. The polymer blend may be obtained by co-precipitation of the polymers by adding a non-solvent or dropping the solution into a precipitant, or also by evaporation of the solvent.

Before the final mixing of all constituents of the blend occurs, individual polymers of the final blend may also be mixed separately. Thus, for example, latices of a resinous copolymer (e.g. styrene-acrylonitrile copolymer) and a rubber (e.g. butadiene-acrylonitrile copolymer) may be mixed by co-precipitation before they are blended with the polycarbonate to form the final moulding composition.

The blending of the starting polymers may, however, also take place in the melt in mixing devices, such as extruders, internal kneaders and mixing rolls.

Conventional additives may be added to the individual constituents of the blend during or after production, also via the solution of melt. Such additives may also be added to the blend during its production. Common additives may also be added to the finished blend, also via its solution or melt.

Typical additives are, for example, stabilizers, nucleating agents, mould release agents, pigments, flame retardants, antistatic agents, conductivity additives, fillers, reinforcing substances and fibres in the conventional amounts. More specifically, for example, graphite, carbon black, metal fibres, metal powder, kieselguhr, talc, quartz, kaolin, mica, clays, $CaF_2$, $CaCO_3$, aluminium oxides, aluminium nitride, silicates, barium sulphate, glass fibres, carbon fibres, ceramic fibres and inorganic pigments, such as $TiO_2$ and iron oxides, may be added, and as mould-release agents, for example, glyceryl stearates, pentaerythritol tetrastearate and trimethylolpropane tristearate.

The blends according to the present invention may be processed thermoplastically to mouldings, e.g. by injection moulding, extrusion, blow moulding or drawing, during which the above-mentioned additives, for example, may be added. Mouldings are to be understood to include, e.g. injection mouldings, extruded mouldings, such as profiles, tubes, sheets, fibres and films, blow-mouldings, such as bottles, canisters and light fittings, as well as, e.g., deep-drawn mouldings from sheets and films.

The films may be converted in combination with other films to laminated films. Furthermore, the present blends may also be used in other composite materials, e.g. in combination with fibres and other polymers.

The mouldings produced from the blends according to the present invention have advantages, because of the properties mentioned previously, over materials known hitherto, especially for components in the electrical and electronic sectors, for large, highly stressed casing components, for the automotive sector as body parts and parts in the engine compartment and for gas-permeable and gas-separating films.

EXAMPLE 1

Polycarbonate of 1,1-bis-(4-hydroxyphenyl)-2-methylcyclohexane (PC-BP2M)

184 g (4.6 moles) NaOH and 282 g (1 mole) 1,1-bis-(4-hydroxyphenyl)-2-methylcyclohexane were dissolved in 3 l water. To this was added 3 l methylene chloride with 3.1 g (0 033 mole) phenol in solution. 148.5 g (1.5 moles) phosgene was then passed into the mixture at 25

.C with intensive agitation over 30 minutes. After addition of 1.13 g 0.01 mole) N-ethylpiperidine, the mixture was agitated intensively for 60 minutes at 25° C. the bisphenolate-free alkaline aqueous phase was separated; the organic phase, after acidification with dilute phosphoric acid, was washed electrolyte-free with water and evaporated. The polycarbonate obtained was then freed from residual methylene chloride by drying. It was colourless and showed a relative viscosity $\eta\eta rel = 1.309$ (measured in methylene chloride at c=5 g/1 and 25° C.).

EXAMPLE 2

Copolymer of bisphenol A and 1,1-bis-(4-hydroxyphenyl)-2-methylcyclohexane in molar ratio 1:1 (CPC-BP2M/BPA) Example 1 was repeated, accept that half of the bisphenol used was replaced by 114 g (0.5 mole) 2,2-bis(4-hydroxyphenyl)-propane (bisphenol A).

The polycarbonate obtained had a relative viscosity $\eta rel = 1\ 306$ (measured in methylene chloride at 25° C. and c=5 g/1).

EXAMPLE 3

Polycarbonate of 1,1-bis-(4-hydroxyphenyl)-2,4-dimethylcyclohexane (PC-BP24DM)

Example 1 was repeated, accept that the bisphenol used was replaced by 296 g (1.0 mole) 1,1-bis-(4-hydroxyphenyl)-2,4-dimethylcyclohexane.

The polycarbonate obtained had a relative viscosity $\eta rel = 1.298$ (measured in methylene chloride at 25° C. and c=5 g/1).

EXAMPLE 4

Polycarbonate of 1,1-bis-(4-hydroxyphenyl)-2-methyl-4-t-butylcyclohexane (PC-BP2M4B)

Example 1 was repeated, except that the bisphenol used was replaced by 324 g (1.0 mole) 1,1-bis-(4-hydroxyphenyl)-2-methyl-4-t-butylcyclohexane I0 The polycarbonate obtained had a relative viscosity $\eta rel = 1\ 303$ (measured in methylene chloride at 25 .C and c = 5 g/1).

EXAMPLE 5

Polycarbonate of 1,1-bis-(4-hydroxyphenyl)-3-methylcyclohexane (PC-BP3M)

Example 1 was repeated, except that the bisphenol used was replaced by 282 g (1 mole) 1,1-bis-(4-hydroxyphenyl)-3-methylcyclohexane.

The polycarbonate obtained had a relative viscosity $\eta rel = 1.301$ (measured in methylene chloride at 25° and c=5 g/1).

Impact resistances were measured on test specimens of PC-BP3M and of the PC-BP2M according to the present invention (see Table). It turned out that the PC-BP2M according to the present invention has considerably higher impact resistance than the PC-BP3M).

TABLE

| Impact resistance of PC-BP2M and PC-BP3M in test specimens 80 × 10 × 4 mm according to ISO 180-IC | | |
|---|---|---|
| Polycarbonate | $\eta rel$ | Impact resistance [kJ/m²] |
| PC-BP2M | 1.306 | not broken |
| PC-BP3M (comparison) | 1.303 | 168 |

EXAMPLE 6

Further polymers used

1. PC-BPA

Polycarbonate of bisphenol A having end groups of, 4-(1,3,3-tetramethyl-butyl)-phenol, $\eta rel = 1.302$ (measured in CH$_2$Cl$_2$ solution at c =5 g/1 and 25° C.

2. PCSI-BPA

Polysiloxane-polycarbonate block copolymer of bisphenol A and polydimethylsiloxane blocks containing 7 weight % (relative to the block copolymer) of bisphenol A end groups, having an average polydimethylsiloxane block length of $\overline{P}_n = 70$ dimethylsiloxane units, $\eta rel = 1.298$ (measured as in Example 1), polycarbonate end groups as in Example 1.

3. APEC 35

Aromatic poly(ester carbonate) of 65 weight % bisphenol A carbonate units and 35 weight % bisphenol A terephthalate units, end groups as in Example 1, $\eta rel = 1.311$ (measured as in Example 2).

4. PA-AM

Amorphous polyamide of hexamethylene diamine and isophthalic acid, $\eta rel = 2.42$ (measured in $\eta$-cresol at 25° C., c=10 g/1 solution), Tg=123° C. (measured by differential thermal analysis).

5. PST

Polystyrene having a weight-average molecular weight $\overline{M}_w = 170,000$.

6. PBT

Polybutylene terephthalate, $\eta rel$ 1.720 (in phenol/o-dichlorobenzene 1/1 parts, by weight, at 25° C., c=5 g/1 solution)

7. PPS

Poly(phenylene sulphide), production process according to EP 171 021, melt viscosity $\eta m = 50$ pa x sec (measured at 306° C. at a shear rate $\tau = 100$ Pa in the cone and plate viscometer).

8. PUR

Thermoplastic polyurethane having a melting range of from ca. 200° to 200° C. and a number-average molecular weight ($\overline{M}_w$) synthesized from an oligomeric ester of butylene glycol and adipic acid ($\overline{M}_n$ 2000), 4,4-diphenylmethane diisocyanate and butanediol-1,4 as chain-extender, ratio of NCO :OH 1.03.

9. SEBS

Partially hydrogenated polystyrene-polybutadiene-polystyrene block copolymer (=polystyrene-polyethylene-butylene-polystyrene block copolymer), Kraton G 1651, commercial product of Shell AG.

10. PB-MMA

Graft polymerisate of 80 weight % polybutadiene and 20 weight % grafted methyl methacrylate, average rubber particle size 0.4 micron.

11. AC-MMA

Graft polymerisate of 80 weight % cross-linked butyl acrylate rubber and 20 weight % grafted methyl methacrylate, average rubber particle size 0.5 micron.

12. PB-SAN

Graft polymerisate of 50 weight % polybutadiene and 50 weight % grafted styrene/acrylonitrile in weight ratio 72/28, average rubber particle size 0.4 micron.

13. AC-SAN

Graft polymerisate of 60 weight % of a cross-linked butyl acrylate rubber and 40 weight % grafted styrene/acrylonitrile, 72/28 parts, by weight, average rubber particle size 0.5 micron.

EXAMPLES 7-19

Properties of the blends according to the present invention are listed in Tables 1-3. The blends were mixed in the melt in a double shaft extruder at temperatures of from 265° to 330° C., each time at the lowest temperature at which there was still a good homogenization of the blend constituents.

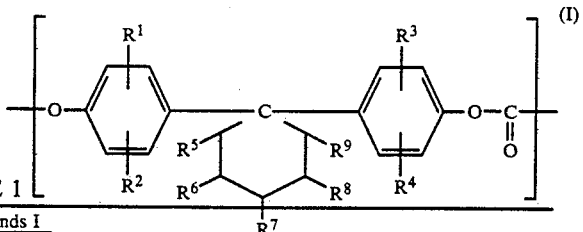

TABLE 1
Polymer Blends I

| Example | PC-BP2M | PC-BP24DM | PC-BP2M4B | PC-BPA | PCSI-BPA | APEC35 | PA-AM | PST | Vicat B °C. | $a_K$ kj/m² | Notes |
|---|---|---|---|---|---|---|---|---|---|---|---|
| 7  | 50 |    |    | 50 |    |    |    |   | 180 | 15 | F |
| 8  |    | 50 |    |    | 50 |    |    |   | 182 | 21 | F |
| 9  |    |    | 30 |    |    | 70 |    |   | 194 | 29 | F |
| 10 |    | 70 |    |    |    |    | 30 |   | 215 | 9  | FF/B |
| 11 |    |    | 95 |    |    |    |    | 5 | 230 | 8  | F |

Vicat B(°C.) = Vicat softening temperature VST/B/100 according to ISO 306 DIN 53 460 on the standard small rod
$a_K$ = notch impact strength at 23° C. according to ISO 179 DIN 53 453 on the standard small rod
F = good flowability of the melt
FF = particularly good flowability of the melt
B = gasoline resistant (bar 80 × 10 × 4 mm, stored 5 min at 25° C. in toluene/isooctane mixture 1/1 parts by weight with 0.6% edge fibre extension), i.e. without cracks in the test specimens after storage.

TABLE 2
Polymer Blends II

| Example | PC-BP24DM | PC-BP2M | CPC-BP2M/BPA | PC-BPA | PCSI-BPA | PBT | PPS | PUR | SEBS | PB-MMA | AC-MMA | Vicat B °C. | $a_K$ kj/m² | Notes |
|---|---|---|---|---|---|---|---|---|---|---|---|---|---|---|
| 12 | 48 |    |    |    | 48 |    |    |    | 4  |    |    | 181 | 19 | B,F |
| 13 |    |    | 35 | 35 |    |    |    | 20 |    | 10 |    | 151 | 31 | B,FF |
| 14 |    | 55 |    |    |    |    | 30 |    |    |    | 15 | 225 | 20 | B,F |
| 15 |    | 55 |    |    |    | 30 |    |    |    |    | 15 | 225 | 12 | B,F |

Vicat B(°C.) = Vicat softening temperature VST/B/100 according to ISO 306 DIN 53 460 on the standard small rod
$a_K$ = notch impact strength at 23° C. according to ISO 179 DIN 53 453 on the standard small rod
F = good flowability of the melt
FF = particularly good flowability of the melt
B = gasoline resistant (bar 80 × 10 × 4 mm, stored 5 min at 25° C. in toluene/isooctane mixture 1/1 parts by weight with 0.6% edge fibre extension), i.e. without cracks in the test specimens after storage.

TABLE 3
Polymer Blends II

| Example | PC-BP2M | CPC-BP2M/BPA | PC-BP24DM | PB-MMA | PB-SAN | AC-MMA | AC-SAN | Vicat B °C. | $a_K$ kj/m² | Notes |
|---|---|---|---|---|---|---|---|---|---|---|
| 16 | 75 |    |    | 25 |    |    |    | 198 | 27 | B |
| 17 |    | 80 |    |    | 20 |    |    | 179 | 31 | B,F |
| 18 |    |    | 80 |    |    | 20 |    | 206 | 26 | B |
| 19 | 85 |    |    |    |    |    | 15 | 204 | 21 | B |

Vicat B(°C.) = Vicat softening temperature VST/B/100 according to ISO 306 DIN 53 460 on the standard small rod
$a_K$ = notch impact strength at 23° C. according to ISO 179 DIN 53 453 on the standard small rod
F = good flowability of the melt
B = gasoline resistant (bar 80 × 10 × 4 mm, stored 5 min at 25° C. in toluene/isooctane mixture 1/1 parts by weight with 0.6% edge fibre extension), i.e. without cracks in the test specimens after storage.

What is claimed is:

1. A thermoplastic molding composition comprising (A) an aromatic polycarbonate resin having a weight average molecular weight $\overline{M}_w$ of at least 10,000 containing bifunctional carbonate structural units corresponding to wherein
$R^1$, $R^2$, $R^3$, $R^4$ independently represent hydrogen, $C_{11}$-$C_{12}$ hydrocarbon radical or halogen; and
$R^5$, $R^6$, $R^7$, $R^8$ and $R^9$ independently represent hydrogen or $C_1$-$C_{12}$ hydrocarbon radical, one of $R^5$ and $R^9$ representing hydrogen and the other $C_1$-$C_{12}$ hydrocarbon;
in amounts of from 100 to 1 % based on the total amount of difunctional carbonate structural units in the polycarbonate.

2. The composition of claim 1 further comprising
(B) from 0 to 99 weight % of at least one amorphous thermoplastic different from (A) having a glass transition temperature of from 40° to 300° C.;
(C) from 0 to 99 weight % of at least one partially crystalline thermoplastic having a melting point of from 60° to 400° C.;
(D) from 0 to 99 weight % of at least one rubber;
(E) from 0 to 99 weight % of at least one graft polymerisate comprising at least one rubber having at least one grafted polymer of at least one monomer selected from vinyl compounds, acrylic and methacrylic compounds and maleic acid derivatives; the sum of (A), (B), (C), (D) and (E) being 100 weight %.

* * * * *